United States Patent
Nishimura et al.

(10) Patent No.: US 7,585,014 B2
(45) Date of Patent: Sep. 8, 2009

(54) SLIDE DOOR OPENING AND CLOSING APPARATUS FOR VEHICLE

(75) Inventors: Tomoaki Nishimura, Kariya (JP); Seiichi Suzuki, Nishikamo-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 386 days.

(21) Appl. No.: 11/593,605

(22) Filed: Nov. 7, 2006

(65) Prior Publication Data

US 2007/0108798 A1     May 17, 2007

(30) Foreign Application Priority Data

Nov. 11, 2005    (JP)   ............... 2005-328019

(51) Int. Cl.
    *B60J 5/06*     (2006.01)
(52) U.S. Cl. ...................... 296/155; 296/146.4; 49/262; 49/360
(58) Field of Classification Search ................. 296/155, 296/146.4; 49/221, 262, 360
See application file for complete search history.

(56) References Cited

U.S. PATENT DOCUMENTS

| | | | | |
|---|---|---|---|---|
| 4,932,715 A | * | 6/1990 | Kramer | ...................... 296/155 |
| 5,168,666 A | * | 12/1992 | Koura et al. | ................... 49/360 |
| 6,081,088 A | * | 6/2000 | Ishihara et al. | ............... 318/466 |
| 6,321,489 B1 | * | 11/2001 | Murofushi et al. | ............ 49/360 |
| 6,826,869 B2 | * | 12/2004 | Oberheide | .................... 49/360 |
| 2003/0089042 A1 | * | 5/2003 | Oberheide et al. | ............. 49/360 |
| 2004/0221510 A1 | * | 11/2004 | Fukumoto et al. | .............. 49/360 |
| 2005/0110300 A1 | * | 5/2005 | Oxley et al. | ................. 296/155 |
| 2006/0042168 A1 | * | 3/2006 | Yamada et al. | ................ 49/360 |
| 2008/0238020 A1 | * | 10/2008 | Okada et al. | ................ 280/166 |

FOREIGN PATENT DOCUMENTS

| | | |
|---|---|---|
| JP | 10-8828 A | 1/1998 |
| JP | 10-266697 A | 10/1998 |

* cited by examiner

*Primary Examiner*—Jason S Morrow
(74) *Attorney, Agent, or Firm*—Buchanan Ingersoll & Rooney PC

(57) ABSTRACT

A slide door opening and closing apparatus for a vehicle includes a drive pulley, a driven pulley, a pulling member extending between the drive pulley and the driven pulley and connected to a slide door, a drive side idle pulley provided in the vicinity of the drive pulley for guiding the pulling member extending at an inner side of the vehicle toward an outer side of the vehicle via the driven pulley, a housing including an opening portion through which the pulling member guided by the drive side idle pulley is inserted, and a partition provided at the opening portion of the housing, the partition interposed between the pulling member at the inner side of the vehicle and the pulling member guided toward the outer side of the vehicle via the driven pulley.

13 Claims, 6 Drawing Sheets

SLIDE DOOR OPENING AND CLOSING APPARATUS FOR VEHICLE

This application is based on and claims priority under 35 U.S.C. § 119 to Japanese Patent Application 2005-328019, filed on Nov. 11, 2005, the entire content of which is incorporated herein by reference.

FIELD OF THE INVENTION

The present invention relates to a slide door opening and closing apparatus for a vehicle.

BACKGROUND

Conventionally, a vehicle such as a minivan includes an automatic opening and closing apparatus for moving a slide door. The automatic opening and closing apparatus is placed at a lower side of a step panel which is provided at a lower part of an opening portion of the vehicle as a step panel when an occupant gets on or gets out the vehicle. Such automatic opening and closing apparatuses are disclosed, for example, in JP10-8828A and JP10-266697A. As illustrated in FIG. 8, the disclosed automatic opening and closing apparatuses include a drive pulley 52 and plural driven pulleys 53 and 54 at a lower surface of a step panel 51 and include a toothed belt 55 among pulleys 52, 53, and 54. The drive pulley 52 is driven by a drive unit such as a motor, or the like. The toothed belt 55 is connected to a slide door 58 via a connect portion 56. The slide door 58 is movable along a guide rail 57.

The opening portion of the vehicle is opened or closed by means of the slide door 58 by driving the drive pulley 52.

The toothed belt 55 is extending along a path defined by plural idle pulleys 59 and 60. The idle pulley 59 is provided so that the drive pulley 52 and the toothed belt 55 ensure the number of gears for mutual meshing. Accordingly, a driving force can efficiently be transmitted. The idle pulley 60 is arranged at the path intended by the toothed belt 55 so that the toothed belt 55 is prevented from flapping due to a vibration. The idle pulley 60 is provided for arranging the toothed belt 55 along the guide rail 57 through which the connect portion 56 is moved.

Positions of the idle pulleys 59 and 60 are defined such that a gear surface of the toothed belt 55 facing the idle pulleys 59 and 60 is not interfered therewith. More specifically, the toothed belt 55 requires a certain degree of flexibility for smooth operation. However, because the slide door 58 has a certain weight, the toothed belt 55 may occasionally be loosened as indicated by a chain double-dashed line in FIG. 8 when the slide door 58 is opened or closed. Therefore, the positions of the idle pulleys 59 and 60 are defined for ensuring a space S so that the upper located toothed belt 55 and the lower located toothed belt 55 do not in contact and interfere with each other. Further, a bracket 61 for supporting the idle pulley 60 is formed for preventing the loosened toothed belt 55 from being unhooked.

Regarding the automatic opening and closing apparatus having the aforementioned configuration, a request has been placed for narrowing a width (a width in a right and left direction in FIG. 8) for an arrangement of components on the vehicle side. However, as described above, the space is required for preventing an interference of the toothed belt 55 facing with each other when the toothed belt 55 is loosened. Therefore, downsizing of the automatic opening and closing apparatus in order to narrow the width of the whole automatic opening and closing apparatus may occasionally be difficult. Further, mountability of the automatic opening and closing apparatus relative to the vehicle may deteriorate and the arrangement of the components on the vehicle side may be limited.

A need thus exists to provide a slide door opening and closing apparatus for a vehicle, of which mountability and a degree of freedom in an arrangement of the components on a vehicle side can be improved.

SUMMARY OF THE INVENTION

According to an aspect of the present invention, a slide door opening and closing apparatus for a vehicle includes a drive pulley, a driven pulley, a pulling member extending between the drive pulley and the driven pulley and connected to a slide door, which performs an opening or closing operation of an opening of a vehicle by the drive pulley, a drive side idle pulley provided in the vicinity of the drive pulley for guiding the pulling member extending at an inner side of the vehicle toward an outer side of the vehicle via the driven pulley, a housing for housing the drive pulley and the drive side idle pulley, the housing including an opening portion through which the pulling member guided by the drive side idle pulley is inserted, and a partition provided at the opening portion of the housing, the partition interposed between the pulling member at the inner side of the vehicle and the pulling member guided toward the outer side of the vehicle via the driven pulley.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
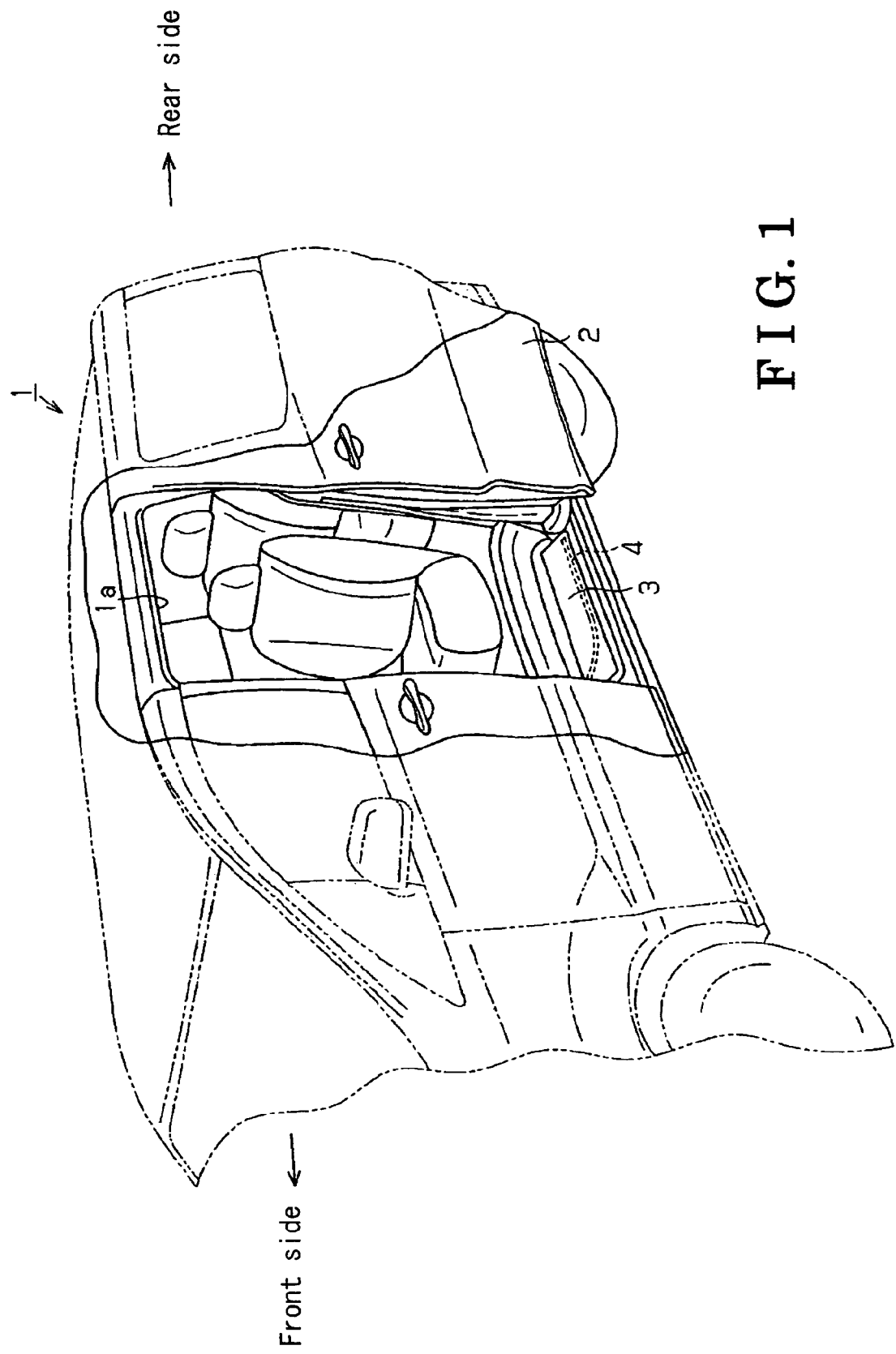
FIG. 1 is a schematic view of a vehicle for explaining a slide door opening and closing apparatus for a vehicle.

An embodiment of the present invention will be explained hereinafter. As illustrated in FIG. 1, a vehicle 1 includes an opening 1a provided at a side of the vehicle 1. The opening 1a is opened and closed by a slide door 2 which is movable in a back and forth direction of the vehicle 1. A step panel 3 extending basically in the back and forth direction of the vehicle 1 is fixed at a lower portion of the opening 1a.

A guide rail 4 extending basically in the back and forth direction of the vehicle 1 is fixed at a lower surface of the step panel 3. More specifically, the guide rail 4 is fixed to a lower portion of the vehicle 1 via the step panel 3. The guide rail 4 is arranged on the lower surface of the step panel 3 at an outer side in a width direction of the vehicle 1. The guide rail 4 is provided for guiding the slide door 2.

Figure 2:
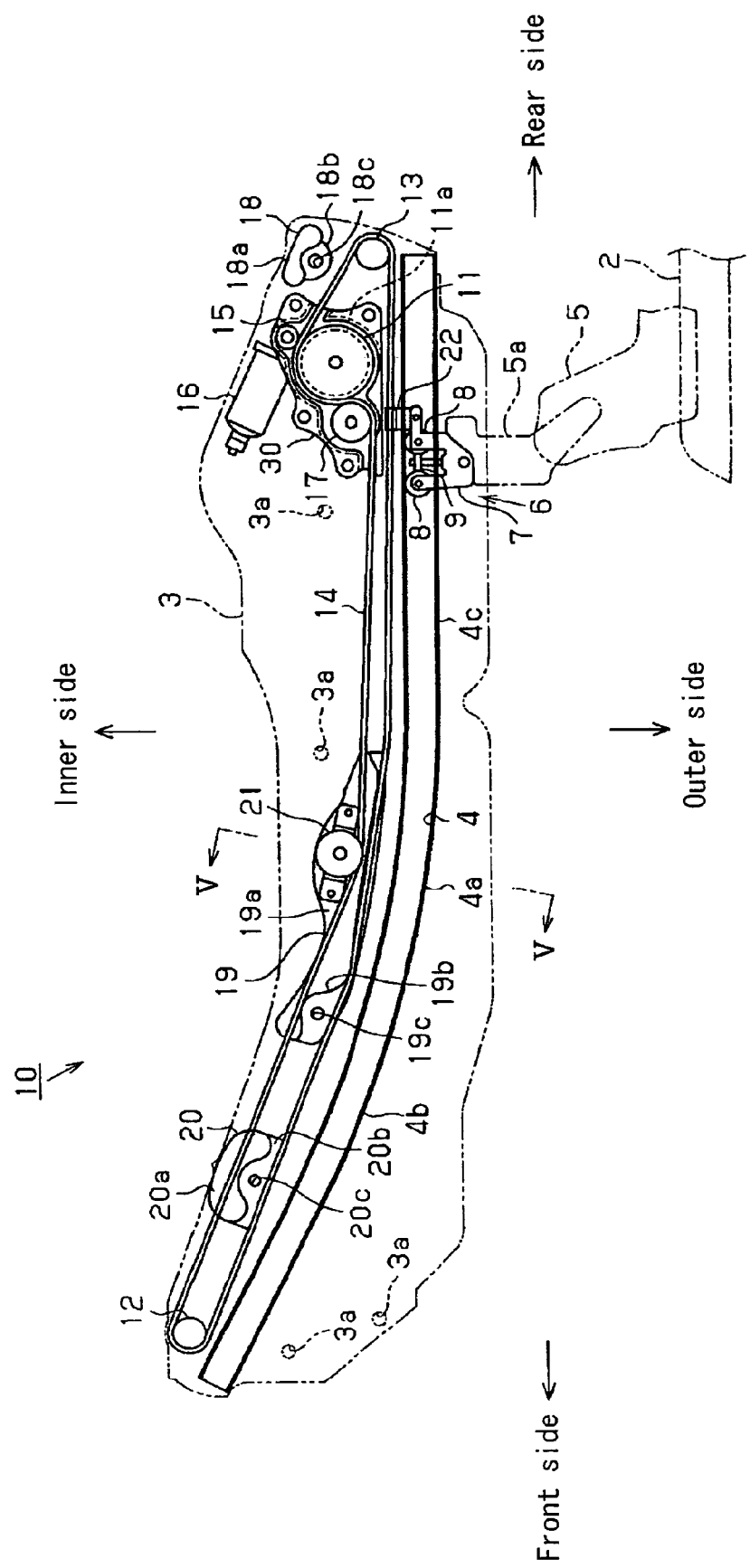
FIG. 2 is a plan view of the slide door opening and closing apparatus for a vehicle according to an embodiment of the present invention.

A structure of the slide door 2 will be explained in detail. An upper side of FIG. 2 is an inner side of the vehicle, i.e., an inner side in the width direction of the vehicle 1. A lower side of FIG. 2 is an outer side of the vehicle, i.e., an outer side in the width direction of the vehicle 1. Further, a left side of FIG. 2 is a front side of the vehicle 1 and a right side of FIG. 2 is a rear side of the vehicle 1.

As illustrated in FIG. 2, the guide rail 4 includes a curved portion 4a at an intermediate position in a longitudinal direction thereof. The guide rail 4 further includes an angled portion 4b and a straight line portion 4c. The angled portion 4b is provided at a front side and inclined towards the inner side in the width direction of the vehicle 1. The straight line portion 4c is provided at a rear side and extended backward of the vehicle 1.

The slide door 2 is slidably supported by the guide rail 4. An arm 5 protruding toward the inner side of the vehicle is provided at a lower portion of the slide door 2. A door roller support member 6 is rotatably connected to a door side bracket 5a connected at an end of the arm 5.

The door roller support member 6 is provided with a bracket 7 rotatably connected to the bracket 5a, a pair of guide rollers 8 rotatably connected to the bracket 7, and a road roller 9 rotatably connected to the bracket 7 between the pair of guide rollers 8. The guide rollers 8 are provided with a rotational shaft extending in a height direction of the vehicle 1. The road roller 9 includes a rotational shaft extending in a direction perpendicular to a flat surface including a central axis of the guide rollers 8. The door roller support member 6 is rotatably supported by the road roller 9 in a condition where the guide rollers 8 are pivotally attached to the guide rail 4.

Accordingly, the slide door 2 connected to the door roller support member 6 via the arm 5 opens and closes the opening 1a (see FIG. 1) of the vehicle 1 by sliding in the back and forth direction of the vehicle 1 along the guide rail 4. A load of the slide door 2 is supported by the road roller 9. More specifically, when the guide rollers 8 are guided along the guide rail 4 at a front side of the curved portion 4a (the angled portion 4b), the slide door 2 is pushed outside of the vehicle immediately after the door 2 is opened from a fully closed state or the slide door 2 is retracted right before the door 2 comes into a fully closed state. It is because, the slide door 2 can be slid backward when the slide door 2 is opening and the slide door 2 comes in flush with a side surface of the vehicle 1 in a condition where the slide door 2 is fully closed.

A mechanism for opening and closing the slide door 2 is attached at the step panel 3 at the inner side of the vehicle relative to the guide rail 4. More specifically, a drive pulley 11, a first driven pulley 12, a second driven pulley 13, and a toothed belt 14, serving as an endless pulling member extending among the pulleys 11, 12, and 13, are provided at the lower surface of the step panel 3. The toothed belt 14 is arranged along the guide rail 4 and includes a gear surface at an inner side thereof The door roller support member 6 is connected to the toothed belt 14.

The first driven pulley 12 is provided in the vicinity of a front end of the guide rail 4 and the second driven pulley 13 is provided in the vicinity of a rear end of the guide rail 4. The first driven pulley 12 and the second driven pulley 13 are rotatably supported by the step panel 3. In other words, the first driven pulley 12 and the second driven pulley 13 are rotatably supported at the lower portion of the vehicle 1 via the step panel 3.

A part of the toothed belt 14, which moves the door roller support member 6 along the guide rail 4, is placed between the first driven pulley 12 and the second driven pulley 13 and is placed at a slide door 2 side, i.e., at the outer side of the vehicle, i.e., at a drive side. The drive pulley 11 is provided so as to mesh with a part of the toothed belt 14 placed between the first driven pulley 12 and the second driven pulley 13 and is placed at an opposite side of the slide door 2, i.e., the inner side of the vehicle, i.e., a return side.

The step panel 3 is provided with a drive motor 16 connected by means of a gear 11a located under the drive pulley 11, a first idle pulley 17 arranged in the vicinity of the drive pulley 11, and a second idle pulley 15 arranged in the vicinity of the drive pulley 11. The first idle pulley 17 represents a drive side idle pulley which guides the toothed belt 14 placed at the inner side of the vehicle toward the outer side of the vehicle. The first idle pulley 17 is provided so that a predetermined number of gear teeth between the toothed belt 14 and the drive pulley 11 are meshed. Accordingly, the driving force of the drive pulley 11 can efficiently be transmitted to the toothed belt 14. The drive pulley 11, the second idle pulley 15, and the first idle pulley 17 are housed in a housing 30 fixed at the lower surface of the step panel 3.

Further, the step panel 3 is formed with plural affixing holes 3a. Plural support brackets are fixed at a lower surface of the step panel 3. According to the embodiment of the present invention, three support brackets 18, 19, and 20 are fixed at the lower surface of the step panel 3. The support bracket 18 is provided at the rear side of the vehicle 1, the support bracket 19 is provided between the toothed belt 14 facing with each other in the vicinity of the curved portion 4a of the guide rail 4, and the support bracket 20 is provided at the inner side of the vehicle 1 relative to the toothed belt 14 in the vicinity of the angled portion 4b of the guide rail 4. In a condition where the affixing holes 3a are fixed by means of bolts, or the like, and the support brackets 18, 19, and 20 are affixed, the step panel 3 is fixed to the vehicle 1.

The support bracket 18 includes an installation surface 18a at a step panel 3 side (the upper side of the vehicle 1) and includes an installation surface 18b at a vehicle body side (the lower side of the vehicle 1). The support bracket 19 includes an installation surface 19a at the step panel 3 side (the upper side of the vehicle 1) and includes an installation surface 19b at the vehicle body side (the lower side of the vehicle 1). The support bracket 20 includes an installation surface 20a at the step panel 3 side (the upper side of the vehicle 1) and includes an installation surface 20b at the vehicle body side (the lower side of the vehicle 1). The installation surfaces 18a, 19a, and 20a of the support brackets 18, 19, and 20 are fixed to the step panel 3 by welding. The installation surface 18b is formed with an affixing hole 18c, the installation surface 19b is formed with an affixing hole 19c, and the installation surface 20b is formed with an affixing hole 20c. The support brackets 18, 19, and 20 are fixed to the vehicle body by means of bolts (not shown) inserted through the affixing holes 18c, 19c, and 20c. Accordingly, the step panel 3 is fixed to the vehicle 1.

At the curved portion 4a of the guide rail 4, an intermediate idle pulley 21 is provided at the inner side of the vehicle relative to the toothed belt 14 and is rotatably supported by the step panel 3. Further, the intermediate idle pulley 21 is provided at the inner side of the vehicle 1 relative to the support bracket 19 serving as a support member. The intermediate idle pulley 21 defines an arrangement path of the toothed belt 14 at the return side and guides the toothed belt 14 placed at the inner side of the vehicle towards the outer side of the vehicle. The support bracket 19 is slidably in contact with the toothed belt 14 at the outer side of the vehicle and guides the toothed belt 14 towards the inner side of the vehicle. According to the embodiment of the present invention, the intermediate idle pulley 21 and the support bracket 19 are arranged close to each other in the width direction of the vehicle. The structures of the intermediate idle pulley 21 and the support bracket 19 will be described below.

As described above, the pulleys 11, 12, and 13, the support bracket 19, and the intermediate idle pulley 21 are provided at the lower surface of the step panel 3. Accordingly, the toothed belt 14 is arranged substantially along the guide rail 4. Further, a bracket 22 fixed to the toothed belt 14 at a guide rail 4 side (the outer side of the vehicle) is connected to the bracket 7 of the door roller support member 6.

With the above described configuration, the slide door 2 connected to the bracket 22 fixed to the toothed belt 14 moves along the guide rail 4 when the drive pulley 11 is activated. Accordingly, the slide door 2 opens and closes the opening 1a of the vehicle (see FIG. 1).

Figure 3:
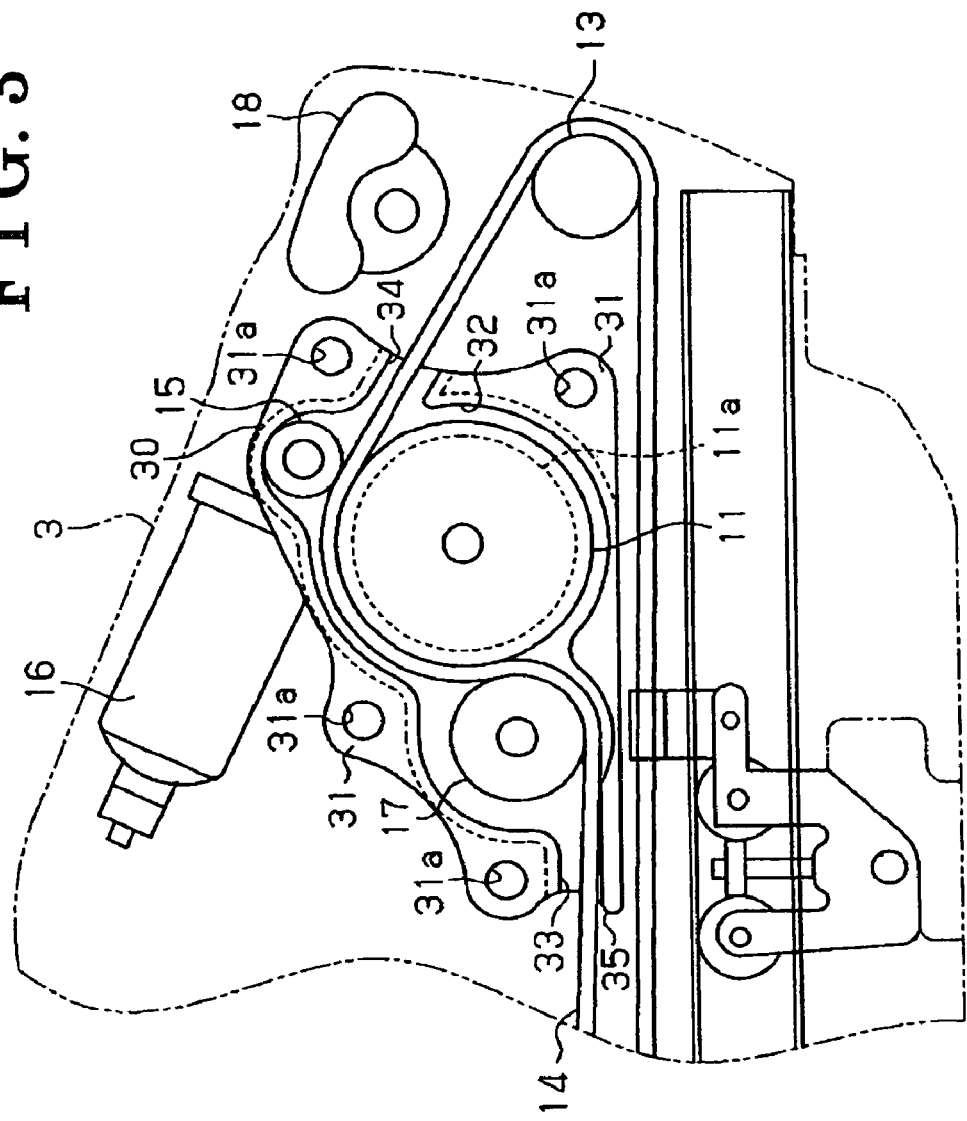
FIG. 3 is a partially enlarged view of FIG. 2.

The structure of the housing 30 will be explained hereinafter. The housing 30 is made of resin, or the like. As illustrated in FIG. 3, the housing 30 includes an installation surface 31 provided at the step panel 3 side (the upper side of the vehicle) and a concave portion 32 shaped relative to the installation surface 31 for housing the drive pulley 11, the second idle pulley 15, and the first idle pulley 17. The installation surface 31 is formed with plural affixing holes 31a. The housing 30 is fixed to the panel 3 by means of bolts (not shown) at the affixing holes 31a. The drive motor 16 is provided at the inner side of the vehicle relative to the concave portion 32 of the housing 30 so that the driving force can be transmitted via the gear 11a arranged coaxial with the drive pulley 11.

The housing 30 is formed with an opening portion 33, through which the toothed belt 14 guided by means of the first idle pulley 17 is inserted, and an opening portion 34, through which the belt 14 in the housing 30 goes through in the back and forth direction. The housing 30 is provided with a partition 35 at a position in which the toothed belt 14 inserted through the opening portion 33 faces with the toothed belt 14 extending along the first driven pulley 12 or the second driven pulley 13.

Figure 8:
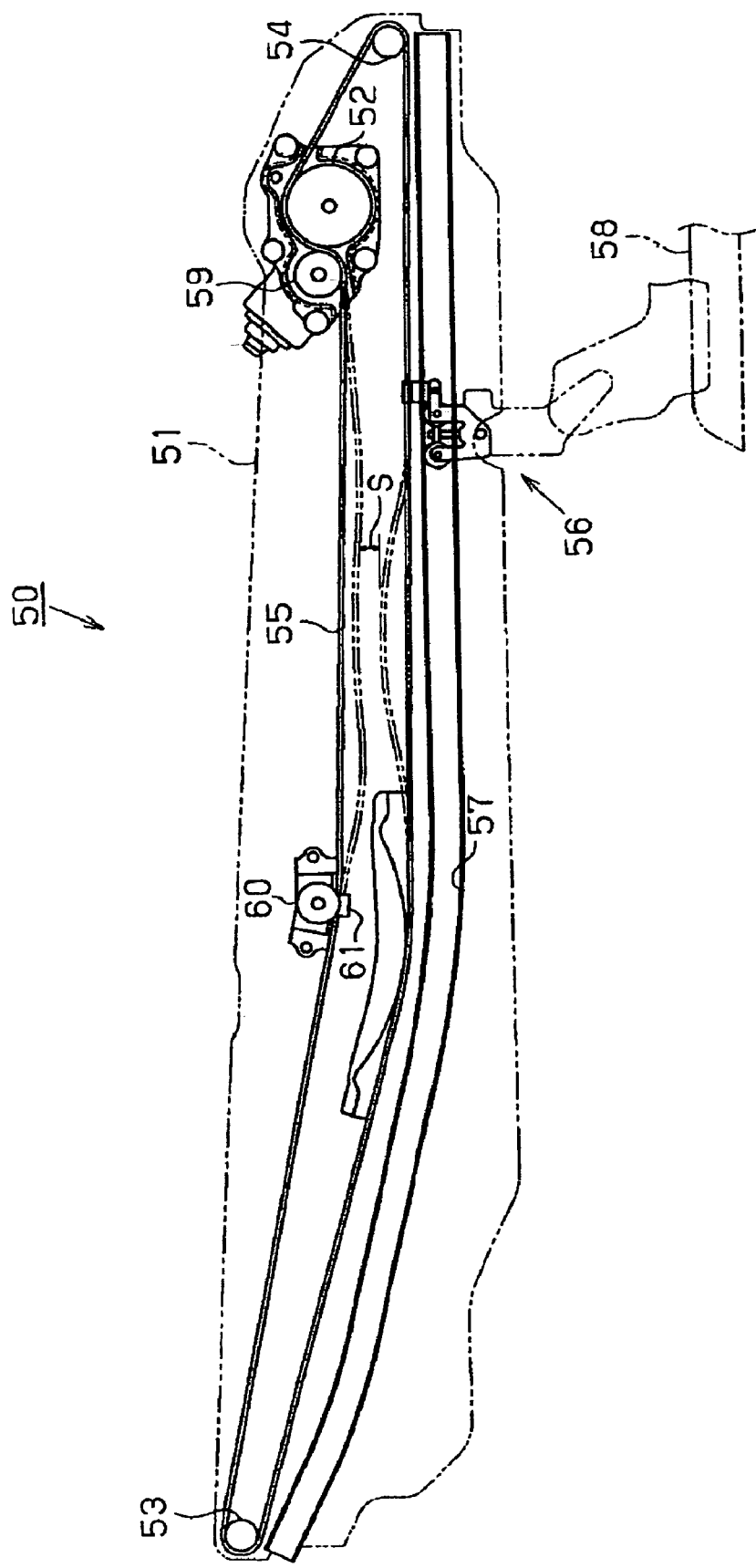
FIG. 8 is a plan view of a slide door opening and closing apparatus for a vehicle according a related art.

Because of the partition 35, a looseness of the toothed belt 14, which is inserted through the opening portion 33, toward the toothed belt 14 facing therewith (toward the outer side of the vehicle) is prevented. More specifically, the looseness indicated by a related art shown in FIG. 8 is not generated between the opening portion 33 and the intermediate idle pulley 21. Therefore, the drive pulley 11 and the first idle pulley 17 can be arranged close to the toothed belt 14 facing with each other.

Figure 4:
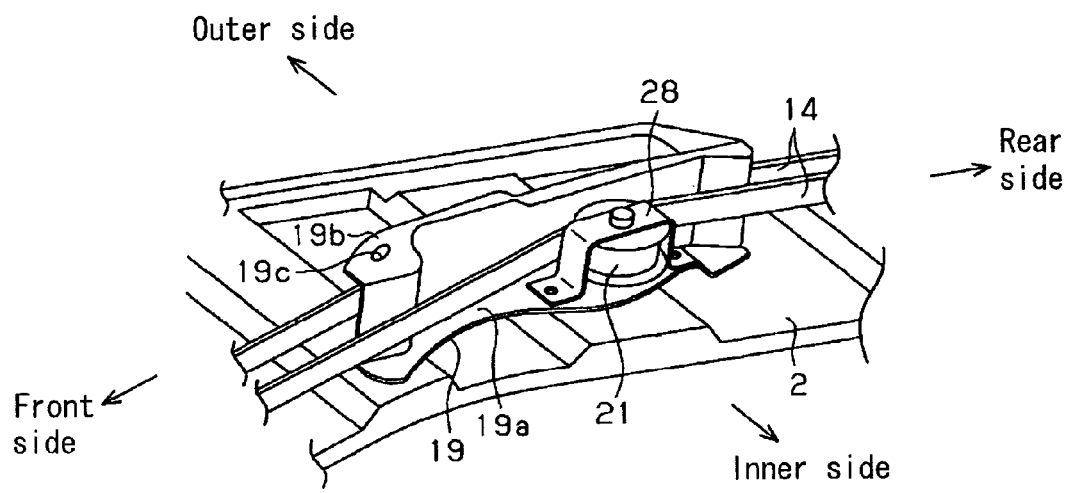
FIG. 4 is a perspective view illustrating a vicinity of an idle pulley.

The structure of the intermediate idle pulley 21 and the support bracket 19 will be explained hereinafter. As illustrated in FIG. 4, the toothed belt 14 placed at the inner side of the vehicle is guided and curved by means of the intermediate idle pulley 21 and the toothed belt 14 placed at the outer side of the vehicle is slidably in contact with the support bracket 19 and curved.

Figure 5:
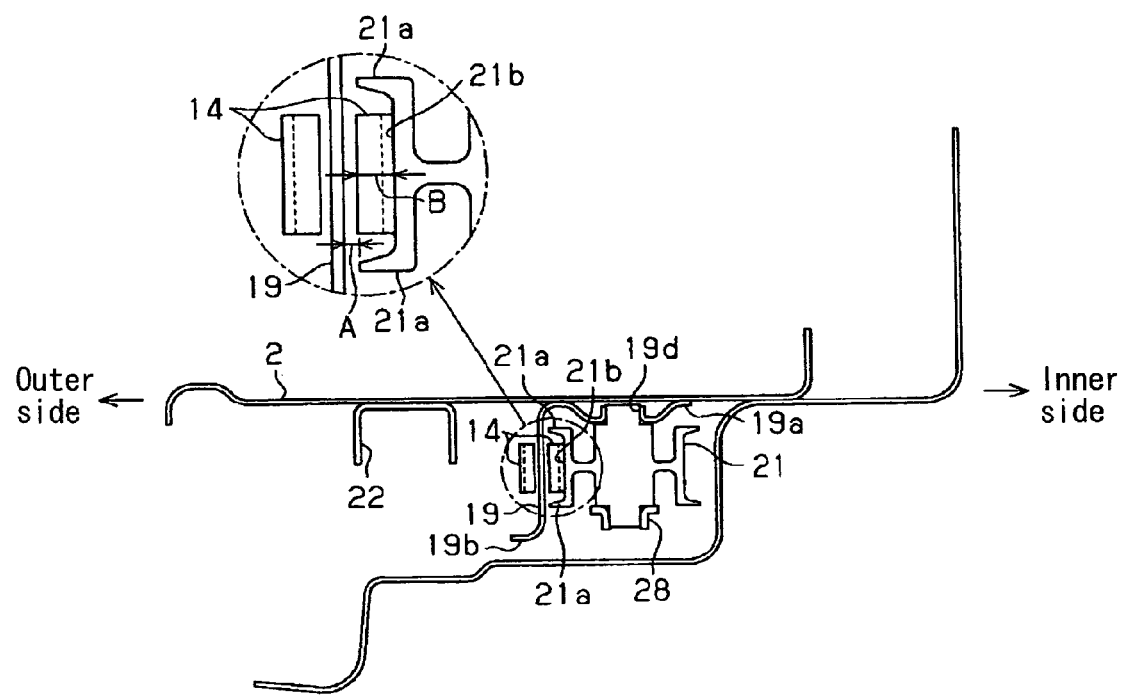
FIG. 5 is a sectional view taken along line V-V of FIG. 2.

As illustrated in FIG. 5, the toothed belt 14 guided by means of the intermediate idle pulley 21 is supported between the intermediate idle pulley 21 and the support bracket 19 in the width direction of the vehicle. Further, a flange portion 21a is provided at an upper end and lower end of the intermediate idle pulley 21. A length of the flange portion 21a is set in such a manner that a distance A between the support bracket 19 and a tip of the flange portion 21a becomes smaller than a thickness B of the toothed belt 14.

Accordingly, the toothed belt 14 disposed between the intermediate idle pulley 21 and the support bracket 19 is prevented from dropping out of a space enclosed by an outer circumferential surface 21b of the intermediate idle pulley 21, an inner surface of the support bracket 19, and flange portions 21a. In other words, even when the toothed belt 14 is loosened, the toothed belt 14 does not drop out from the space between the flange portions 21a and the inner surface of the support bracket 19 unless an extreme force is applied thereto. Accordingly, the toothed belt 14 can be prevented from dropping out of the intermediate idle pulley 21.

According to the embodiment of the present invention, the intermediate idle pulley 21 is fixed to the support bracket 19. More specifically, the intermediate idle pulley 21 is fixed to the support bracket 19 at an affixing hole 19d after the support bracket 19 is fixed to the step panel 3 by welding, or the like,. Then, a fixing bracket 28, which sandwiches the intermediate idle pulley 21, is fixed to the support bracket 19 by riveting, or the like. Accordingly, intermediate idle pulley 21 is fixed to the support bracket 19.

For example, if the intermediate idle pulley 21 is not fixed to the support bracket 19 but directly fixed to the step panel 3, assembling deviations of the intermediate idle pulley 21 relative to the step panel 3 may be generated and assembling deviations of the support bracket 19 relative to the step panel 3 may be generated. In consequence, deviations in dimension between the intermediate idle pulley 21 and the support bracket 19 may be increased.

According to the embodiment of the present invention, because the intermediate idle pulley 21 is fixed to the support bracket 19, the deviations in dimension between the intermediate idle pulley 21 and the support bracket 19 can be restricted to the assembling deviations of the intermediate idle pulley 21 relative to the support bracket 19. Accordingly, a dimension accuracy can be improved.

According to the embodiment of the present invention, following advantages can be obtained.

According to the embodiment of the present invention, at the opening portion 33 of the housing 30, which houses the drive pulley 11, the partition 35 is provided at the position in which the toothed belt 14, inserted through the opening portion 33 facing with the toothed belt 14, is extending along the first driven pulley 12 or the second driven pulley 13. Therefore, the toothed belt 14 facing with each other in the vicinity of the opening portion 33 can be prevented from contacting each other because of the partition 35. In consequence, the toothed belt 14 facing with each other can be arranged close to each other. Accordingly, the slide door opening and closing apparatus 10 for the vehicle can be downsized. Further, a mountability of the slide door opening and closing apparatus 10 relative to the vehicle 1 can be improved and a degree of freedom in an arrangement of the components on a vehicle side can be improved.

According to the embodiment of the present invention, the intermediate idle pulley 21, which guides the toothed belt 14 placed at the inner side of the vehicle toward the outer side of the vehicle, and the support bracket 19, which is slidably in contact with the toothed belt 14 placed at the outer side of the vehicle, are arranged close to each other. The intermediate idle pulley 21 and the support bracket 19 are disposed between the drive pulley 11 and the first driven pulley 12. More specifically, the intermediate idle pulley 21 and the support bracket 19 can be arranged close to each other because the toothed belt 14 facing with each other between the opening portion 33 of the housing 30 and the intermediate idle pulley 21 is prevented from contacting each other because of the partition 35 at the opening portion 33 of the housing 30. Therefore, even when the toothed belt 14 is loosened, in order to ensure a space for preventing a contact of the toothed belt 14 facing each other, a space between the intermediate idle pulley 21 and the vehicle 1 can be increased relative to a condition in which the intermediate idle pulley 21 and the support bracket 19 are arranged away from each other.

According to the embodiment of the present invention, the toothed belt 14 is supported between the intermediate idle pulley 21 and the support bracket 19 by means of the support bracket 19 which is slidably in contact with the toothed belt 14 placed at the outer side of the vehicle. Therefore, a component for supporting the toothed belt 14 relative to the intermediate idle pulley 21 is not required.

According to the embodiment of the present invention, the flange portion 21a, which makes the distance A between the intermediate idle pulley 21 and the support bracket 19 smaller than the thickness B of the toothed belt 14, is provided. Therefore, the toothed belt 14, which is guided by the intermediate idle pulley 21, can be prevented from dropping out of the intermediate idle pulley 21.

According to the embodiment of the present invention, the intermediate idle pulley 21 is fixed to the support bracket 19. Therefore, the accuracy of the dimension between the intermediate idle pulley 21, the support bracket 19, and the step panel 3 can be improved compare with a condition in which the intermediate idle pulley 21 and the support bracket 19 are individually fixed to the step panel 3. According to the embodiment of the present invention, the support bracket 19 is fixed by spot welding and the intermediate idle pulley 21 is fixed by riveting. Because the spot welding has difficulties to ensure the accuracy of the dimension relative to the riveting, the above described advantage can especially be obtained to the embodiment of the present invention. Accordingly, the toothed belt 14 disposed between the intermediate idle pulley 21 and the support bracket 19 can reliably be held between the intermediate idle pulley 21 and the support bracket 19.

The embodiment of the present invention is not limited to the above described structure. Variations and changes may be made by others.

Figure 6:
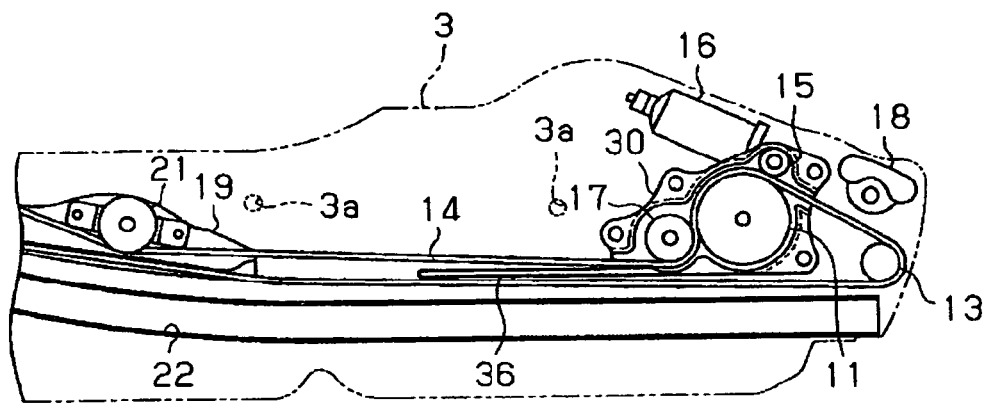
FIG. 6 is a plan view of a slide door opening and closing apparatus for a vehicle according to a variation of the present invention.
Figure 7:
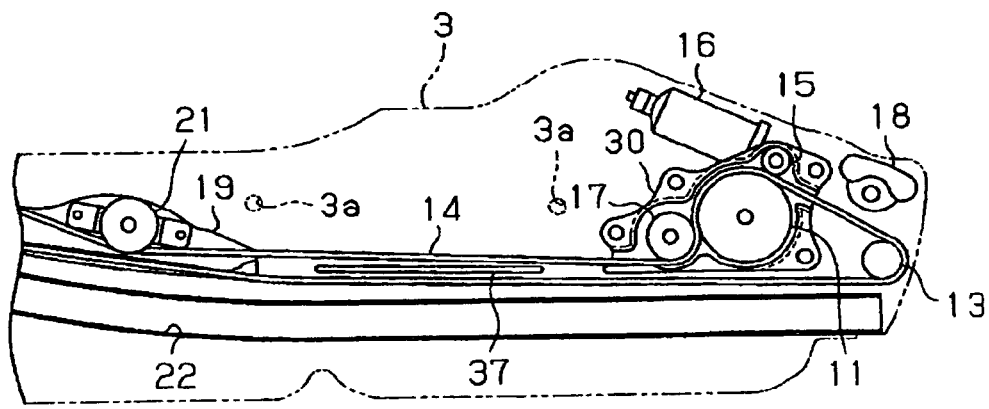
FIG. 7 is a plan view of a slide door opening and closing apparatus for a vehicle according to another variation of the present invention.

According to the embodiment of the present invention, the partition 35 is provided at the opening portion 33 of the housing 30. However, the present invention is not limited thereto. Alternatively, or in addition, an extension portion 36, extending along the toothed belt 14 inserted through the opening portion 33, may be provided continuously from the partition 35 as illustrated in FIG. 6. With such configuration, the toothed belt 14 facing with each other in the vicinity of the opening portion 33 of the housing 30 can reliably be prevented from contacting each other because of the partition 35 and the extension portion 36. Further, as illustrated in FIG. 7, in addition to the partition 35 provided at the housing 30, a partition 37 may be provided between the toothed belt 14 placed away from the housing 30.

According to the embodiment of the present invention, the partition 35 is provided at the housing 30 and the intermediate idle pulley 21 and the support bracket 19 are arranged close to each other. However, the present invention is not limited thereto. Alternatively, or in addition, the intermediate idle pulley 21 and the support bracket 19 may be arranged away from each other. Even with such configuration, the slide door opening and closing apparatus 10 can sufficiently be downsized. Further, the mountability of the slide door opening and closing apparatus 10 relative to the vehicle 1 can be improved and a degree of freedom in the arrangement of the components on the vehicle side can be improved.

According to the embodiment of the present invention, the toothed belt 14 guided by means of the intermediate idle pulley 21 is held between the intermediate idle pulley 21 and the support bracket 19. However, the present invention is not limited thereto. Alternatively, or in addition, the toothed belt 14 may not be supported by the support bracket 19. For example, the intermediate idle pulley 21 may be provided in the vicinity of the support bracket 19 and a clamp may be provided for supporting the toothed belt 14 relative to the intermediate idle pulley 21.

According to the embodiment of the present invention, the intermediate idle pulley 21 is provided with the flange portion 21a. However, the present invention is not limited thereto. The intermediate idle pulley 21 is not necessarily provided with the flange portion 21a. The present invention is applicable as long as the toothed belt 14 guided by means of the intermediate idle pulley 21 is not dropped out of the intermediate idle pulley 21.

According to the embodiment of the present invention, the intermediate idle pulley 21 is fixed to the support bracket 19. However, the intermediate idle pulley 21 is not necessarily fixed to the support bracket 19.

According to the embodiment of the present invention, the toothed belt 14 is used as the endless pulling member. However, the present invention is not limited thereto. Alternatively, or in addition, an endless wire, or the like, may be used as the endless pulling member.

According to a first aspect of the present invention, at the opening portion of the housing, which houses the drive pulley, the partition is provided at the position in which the toothed belt inserted through the opening portion facing with the toothed belt extending along the first driven pulley or the second driven pulley. Therefore, the endless pulling member facing with each other in the vicinity of the opening portion can be prevented from contacting with each other because of the partition. In consequence, the endless pulling member facing with each other can be arranged close to each other. Accordingly, the slide door opening and closing apparatus for the vehicle can be downsized. Further, the mountability of the slide door opening and closing apparatus relative to the vehicle can be improved and the degree of freedom in the arrangement of the components on the vehicle side can be improved.

According to a second aspect of the present invention, the extension portion, extending along the endless pulling member inserted through the opening portion, is provided continuously from the partition. Therefore, the endless pulling member facing with each other in the vicinity of the opening portion of the housing can reliably be prevented from contacting with each other because of the partition and the extension portion.

According to third and fourth aspects of the present invention, the intermediate idle pulley, which guides the endless pulling member placed at the inner side of the vehicle toward the outer side of the vehicle, and the support bracket, which is slidably in contact with the endless pulling member placed at the outer side of the vehicle, are arranged close to each other. The intermediate idle pulley and the support bracket are disposed between the drive pulley and the first driven pulley. More specifically, the intermediate idle pulley and the support bracket can be arranged close to each other because the endless pulling member facing each other between the opening portion of the housing and the intermediate idle pulley is prevented from contacting each other because of the partition at the opening portion of the housing. Therefore, even when the endless pulling member is loosened, in order to ensure the space for preventing a contact of the toothed belt facing each other, the space between the intermediate idle pulley and the vehicle can be increased relative to the condition in which the intermediate idle pulley and the support bracket are arranged away from each other. Accordingly, the slide door opening and closing apparatus for the vehicle can be downsized. Further, the mountability of the slide door opening and closing apparatus relative to the vehicle can be improved and the degree of freedom in the arrangement of the components on the vehicle side can be improved.

According to a fifth aspect of the present invention, the endless pulling member is held between the intermediate idle pulley and the support member by means of the support member being slidably in contact with the endless pulling member. Therefore, the component for supporting the endless pulling member relative to the intermediate idle pulley is not required.

According to a sixth aspect of the present invention, the flange portion is provided for making a space between the intermediate idle pulley and the support member smaller than the thickness of the endless pulling member. Therefore, the endless pulling member, which is guided by the intermediate idle pulley, can be prevented from dropping out of the intermediate idle pulley.

According to a seventh aspect of the present invention, the intermediate idle pulley is fixed to the support bracket. Therefore, the accuracy of the dimension between the intermediate idle pulley, the support bracket, and the step panel can be improved compared with a condition in which the intermediate idle pulley and the support bracket are individually fixed to the step panel. The above described advantage can be obtained especially in a condition in which a fixing method of the support member relative to the panel has difficulty in the accuracy of the dimension. Accordingly, the endless pulling member disposed between the intermediate idle pulley and the support bracket can reliably be held between the intermediate idle pulley and the support bracket.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A slide door opening and closing apparatus for a vehicle comprising:
   a drive pulley;
   a driven pulley;
   a pulling member extending between the drive pulley and the driven pulley and connected to a slide door, which performs an opening or closing operation of an opening of a vehicle by the drive pulley;
   a drive side idle pulley provided in the vicinity of the drive pulley for guiding the pulling member extending at an inner side of the vehicle toward an outer side of the vehicle via the driven pulley;
   a housing for housing the drive pulley and the drive side idle pulley, the housing including an opening portion through which the pulling member guided by the drive side idle pulley is inserted;
   a partition provided at the opening portion of the housing, the partition interposed between the pulling member at the inner side of the vehicle and the pulling member guided toward the outer side of the vehicle via the driven pulley;
   an intermediate idle pulley provided between the drive side idle pulley and the driven pulley for guiding the pulling member at the inner side of the vehicle toward the outer side of the vehicle; and
   a support member provided between the pulling member at the inner side of the vehicle and the pulling member guided toward the outer side via the driven pulley, the support member fixing a panel, to which the drive pulley and the driven pulley are fixed, to a vehicle body, wherein
   the intermediate idle pulley and the support member are arranged close to each other.

2. The slide door opening and closing apparatus for a vehicle according to claim 1, wherein the housing further includes an extension portion continuously formed from the partition and extending along the pulling member inserted through the opening portion.

3. The slide door opening and closing apparatus for a vehicle comprising:
   a drive pulley;
   a driven pulley;
   a pulling member extending between the drive pulley and the driven pulley and connected to a slide door, which performs an opening or closing operation of an opening of a vehicle by the drive pulley;
   a drive side idle pulley provided in the vicinity of the drive pulley for guiding the pulling member extending at an inner side of the vehicle toward an outer side of the vehicle via the driven pulley;
   a housing for housing the drive pulley and the drive side idle pulley, the housing including an opening portion through which the pulling member guided by the drive side idle pulley is inserted;
   a partition provided at the opening portion of the housing, the partition interposed between the pulling member at the inner side of the vehicle and the pulling member guided toward the outer side of the vehicle via the driven pulley;
   the housing further including an extension portion continuously formed from the partition and extending along the pulling member inserted through the opening portion;
   an intermediate idle pulley provided between the drive side idle pulley and the driven pulley for guiding the pulling member at the inner side of the vehicle toward the outer side of the vehicle; and
   a support member provided between the pulling member at the inner side of the vehicle and the pulling member guided toward the outer side via the driven pulley, the support member fixing a panel, to which the drive pulley and the driven pulley are fixed, to a vehicle body, wherein
   the intermediate idle pulley and the support member are arranged close to each other.

4. The slide door opening and closing apparatus for a vehicle according to claim 1, wherein the pulling member guided by means of the intermediate idle pulley is held between the intermediate idle pulley and the support member.

5. The slide door opening and closing apparatus for a vehicle according to claim 3, wherein the pulling member guided by means of the intermediate idle pulley is held between the intermediate idle pulley and the support member.

6. The slide door opening and closing apparatus for a vehicle according to claim 4, wherein the intermediate idle pulley includes a flange portion at an upper end and a lower end thereof, a length of each flange portion being set so that a distance between the each flange portion and the support member becomes smaller than a thickness of the pulling member.

7. The slide door opening and closing apparatus for a vehicle according to claim 5, wherein the intermediate idle pulley includes a flange portion at an upper end and a lower end thereof, a length of each flange portion being set so that a distance between the each flange portion and the support member becomes smaller than a thickness of the pulling member.

8. The slide door opening and closing apparatus for a vehicle according to claim 1, wherein the intermediate idle pulley is fixed to the support member.

9. The slide door opening and closing apparatus for a vehicle according to claim 3, wherein the intermediate idle pulley is fixed to the support member.

10. The slide door opening and closing apparatus for a vehicle according to claim 4, wherein the intermediate idle pulley is fixed to the support member.

11. The slide door opening and closing apparatus for a vehicle according to claim 5, wherein the intermediate idle pulley is fixed to the support member.

12. The slide door opening and closing apparatus for a vehicle according to claim 6, wherein the intermediate idle pulley is fixed to the support member.

13. The slide door opening and closing apparatus for a vehicle according to claim 7, wherein the intermediate idle pulley is fixed to the support member.

* * * * *